UNITED STATES PATENT OFFICE.

CHARLES N. WAITE, OF NEWTON, MASSACHUSETTS.

PROCESS OF MANUFACTURING LACTIC ACID.

SPECIFICATION forming part of Letters Patent No. 455,078, dated June 30, 1891.

Application filed October 27, 1890. Serial No. 369,502. (No specimens.)

*To all whom it may concern:*

Be it known that I, CHARLES N. WAITE, of Newton, county of Middlesex, State of Massachusetts, have invented certain new and useful Improvements in the Process of Manufacturing Lactic Acid, of which the following is a specification.

In the manufacture, commercially, of lactic acid, as now practiced, so far as known to me, sulphureted hydrogen, which is a noxious and dangerous gas, is employed to decompose the zinc lactate. Difficulty is also experienced in getting rid of the iron, which is a common impurity in lactates.

My invention has for its object to avoid the use of sulphureted hydrogen as well as the difficulties resulting from the presence of iron; and it consists in the process hereinafter described, and which is more particularly pointed out in the claim which is appended hereto and made a part hereof.

I employ crude lactate of lime or zinc, which may be produced in any of the well-known methods. If the lime salt is used, it is first transformed into zinc salt by adding sulphate of zinc at boiling temperature, the resulting sulphate of lime being filtered out, or sulphuric acid may be added, the solution being then filtered and the lactic acid neutralized with oxide or carbonate of zinc. By this means the zinc salt is obtained, which is then crystallized and recrystallized to free it from impurities. The pure salt is then dissolved in boiling water and an excess of milk of lime added, which precipitates all of the zinc as an oxide. This is removed by filtering, and sulphuric acid is added to the filtrate until all the lime therein is precipitated as sulphate of lime. The solution is again filtered to remove the sulphate thus precipitated, and the resulting filtrate is a pure dilute solution of lactic acid, which may be concentrated to any desired extent.

If the solution of zinc salt to which the milk of lime has been added is not sufficiently boiled before filtration, a trace of the zinc salt will remain in the solution. This may be readily removed by continued boiling or by adding a small quantity of an alkaline sulphide or sulphureted hydrogen. The use of a trace of sulphureted hydrogen is not especially objectionable; but I prefer to avoid it wholly and remove the zinc entirely by boiling with milk of lime, as above set forth.

What I claim is—

The process herein described of manufacturing lactic acid from crude salts, such as zinc lactate, which consists in dissolving the same in boiling water, adding to the solution an excess of milk of lime, removing the precipitate thus formed by filtration, adding sulphuric acid to the filtrate, and filtering again to remove the sulphate of lime, substantially as shown and described.

CHARLES N. WAITE.

Witnesses:
WM. A. MACLEOD,
ROBERT WALLACE.